Oct. 26, 1954
C. E. FRANK ET AL
2,692,841
RUBBER-LIKE CEMENT AND LAMINATED STRUCTURE BONDED THEREWITH
Filed Dec. 1, 1950
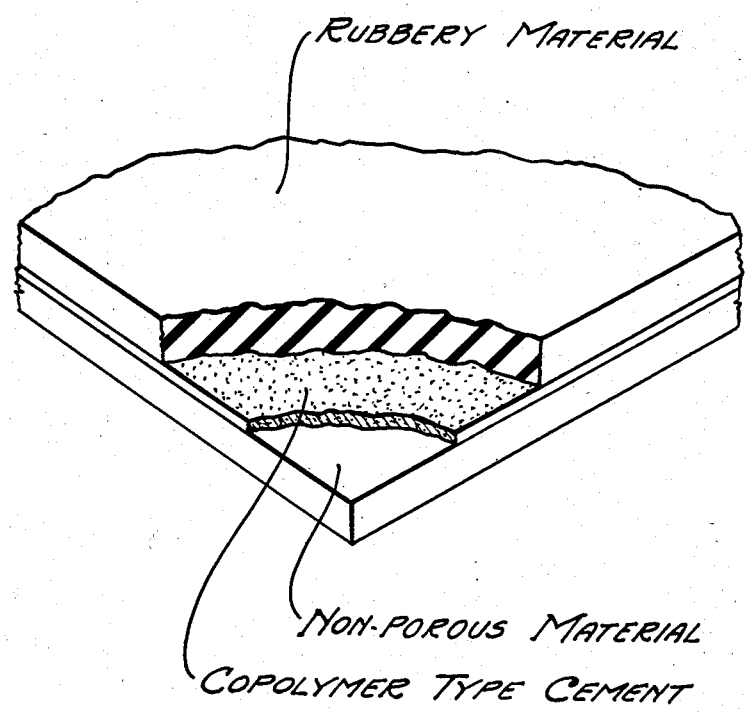
INVENTORS
CHARLES E. FRANK
GERARD KRAUS
by Willits Hurdman
THEIR ATTORNEYS Patented Oct. 26, 1954

2,692,841

UNITED STATES PATENT OFFICE 2,692,841

RUBBERLIKE CEMENT AND LAMINATED STRUCTURE BONDED THEREWITH

Charles E. Frank and Gerard Kraus, Cincinnati, Ohio, assignors to General Motors Corporation, Detroit, Mich., a corporation of Delaware Application December 1, 1950, Serial No. 198,760

13 Claims. (Cl. 154—43)

This invention relates to cements and is particularly concerned with cements for adhesion between rubber-like materials and substantially non-porous materials.

This application is a continuation-in-part of our original application, Serial No. 133,489, filed December 16, 1949, now abandoned.

It is the basic object of the invention to provide a cement for adhering rubber-like material taken from that class of materials consisting of natural rubber, polychloroprene and any of the butalastic polymers including a single ethylenic double bond >C=C< which are copolymerizable with butadiene 1,3 in aqueous emulsion and mixtures thereof to hard non-porous material such as metal, wood, glass and the like.

In carrying out the above object, it is a further object to provide a cement which may be used in connection with rubber-like materials and metal wherein brass plate on the metal is eliminated and wherein a single coat of cement may be used to provide a highly satisfactory adhesion layer.

A still further object of the invention is to provide a cement which comprises a copolymer of a diene and an unsaturated organic acid, together with a suitable accelerator, dissolved in a solvent wherein the diene compound may be selected from the class consisting of butadiene and isoprene and wherein the unsaturated acid may be selected from the class consisting of methacrylic acid and acrylic acid.

A still further object of the invention is to provide a cement for adhesion purposes between rubber-like materials and non-porous surfaces comprising butadiene-methacrylic acid copolymers wherein the methacrylic acid ranges from 15 to 27% of the compound, said compound being dissolved in a suitable solvent selected from any of the well known solvents, such as, cyclohexanone, dioxane, mixtures thereof, together with mixtures of cyclohexanone with chloro-benzene and cyclohexanone with chloroform-dioxane, etc.

A still further object of the invention is to include a small quantity of a suitable peroxide as an accelerator within the cement.

Further objects and advantages of the present invention will be apparent from the following description, reference being had to drawing, wherein the single figure shows a fragmentary view, partly in section, of rubbery material bonded to a non-porous material through an intermediate cement layer.

Ahesion cements for providing an adhesion layer between rubber-like materials, such as, natural rubber, polychloroprene, and any of the butalastic polymers including a single ethylenic double bond >C=C< which are copolymerizable with butadiene 1,3 in aqueous emulsion and mixtures thereof, and non-porous materials, such as, metal, for example, steel, iron, ferrous alloys, Monel metal and the like or for that matter other non-porous materials such as wood, glass, etc., are difficult to control so that consistent pulls may be obtained wherein brass plate is eliminated from the metal surface. It appears that brass plate tends to condition the metallic surface thereby creating better adhesion between the cement and the metal. It is apparent that the addition of brass plate is costly and the plating operation is very critical in its control factors in order to obtain a plate which is of a satisfactory, continuous character. Furthermore, these plated articles must necessarily be used almost immediately after plating or oxidation occurs which renders the plated surface unsuitable for cementing operations.

In the manufacture of motor mounts for example wherein rubber-like material is cemented to a steel backing member and wherein the entire assembly is used to carry a motor, such as an internal combustion engine for an automobile, it is necessary to have very good adhesion between the rubber-like material and the metal and the bond must be of such character as to withstand high pulls. In fact pulls under 750 pounds per square inch render the mount unsafe for use so that it is necessary in all cases to obtain a bond between the rubber-like material and the metal which will withstand at least 750 pounds per square inch pull as determined by the standard ASTM test.

We have discovered that an excellent cement may be manufactured which does not require brass plate and which consistently withstands pulls well above the minimum figure herein noted, wherein a copolymer of a diene compound and an unsaturated organic acid is utilized as the essential ingredient together with small quantities of a suitable accelerator. The preferred combination is the copolymer of butadiene and methacrylic acid wherein the butadiene ranges from 73 to 85% of the copolymer with the methacrylic acid making up the remainder. This copolymer is dissolved with a peroxide accelerator in a solvent, for example, cyclohexanone, dioxane, or combinations of cyclohexanone with either chlorobenzene and chloroform, dioxane, etc. A cement of this character is then coated onto a metal insert by spraying, dipping or painting, etc., in a thin layer, and dried. This part is then assembled with the rubber-like insert and cured under pressure at conventional curing temperatures, for example, 300° F., for one-half hour and presents a bond that is extremely strong. Pulls up to 2800 pounds (per 2 square inch test piece) have been obtained with such a cement and consistent results at around 2000 pounds have been obtained. The optimum combination of ingredients appears to be about 17–24% methacyrlic acid, with the pulls dropping off on either side of this figure to approximately 1500 pounds on a two square inch sample at either end of the range herein given.

In place of butadiene we have found that isoprene may be used, and in place of methacrylic acid, acrylic acid may be used. Furthermore, in some cases, the methacrylic acid may be supplemented with styrene which gives satisfactory results when used in about equal quantities with methacrylic acid.

The accelerator to be used may be selected from the broad class of peroxides, preferably organic peroxides, although it has been found that hydrogen peroxide (30%) is useful. Among the organic compounds found to be satisfactory are:

Cumene hydroperoxide
Tertiary butyl hydroperoxide
Cyclohexanone peroxide (a commercial mixture of at least two peroxides, the principal constituent being 1-hydroxy cyclohexyl hydroperoxide-1)
Lupersol DDM (60° methyl ethylketone peroxide)

The quantity of peroxide to be used may vary over a rather wide range and calculated on the basis of active oxygen, this figure may range from 0.3% to 5.0% of the weight of copolymer (dry weight basis) with a 0.5% to 3.0% range being preferred.

In making up the copolymer to be used in the cement noted herein, the following ingredients are weighed into a glass reactor, the parts being illustrative of one reaction, it being understood that these figures may vary in accordance with the ranges given herein:

*Example 1*

| | Parts by weight |
|---|---|
| Butadiene | 49 |
| Methacrylic acid | 7.9 |
| Potassium persulfate | .18 |
| Triton 773 | 3.0 |
| Tertiary dodecyl mercaptan (modifier) | 0.12 |
| Redistilled water | 108 |

Triton 773 is a 20% paste of a sodium salt of an alkylaryl polyether sulfate. The reactor is closed and agitated at 50° C. for 16.5 hours, is cooled and opened and the copolymer is precipitated by pouring into brine. Unreacted monomers may be removed by steam distillation and a water wash. The product after drying represents an 85% yield with methacrylic acid being present in quantities of 18% by weight.

The material itself is of a rubbery consistency and has general properties which are stiffer and harder and less elastic than natural rubber but it can be worked on a rubber mill. Cyclohexanone and dioxane are the most effective solvents yielding viscous solutions wherein very small concentrations of gel, if any, are present.

The cement itself is made by dispersing (2–10%, 4% preferred) of the copolymer with a suitable accelerator in cyclohexanone until the mixture is substantially homogeneous. In application, the cement is applied by spraying, drying or painting, etc., and dried on grit blasted or otherwise suitably cleaned and prepared steel surfaces and the cleaned rubber-like material to be bonded thereto is placed thereon and cured at 50 pounds steam in a press for about thirty minutes.

*Example 2*

| | Parts by weight |
|---|---|
| Butadiene | 45 |
| Methacrylic acid | 12.5 |
| Potassium persulfate | 0.18 |
| Triton 773 | 0.3 |
| Tertiary dodecyl mercaptan (modifier) | .12 |
| Redistilled water | 108 |

The polymerization was carried out for ten hours at 50° C. The product obtained in the 72% conversion showed methacrylic acid at 24.6%.

*Example 3*

| | Parts by weight |
|---|---|
| Butadiene | 48.9 |
| Acrylic acid | 8.6 |
| Potassium persulfate | .18 |
| Triton X–301 | 3.0 |
| Redistilled water | 108 |

A reaction time of 31 hours at 50° C. yielded a conversion of 80%.

*Example 4*

| | Parts by weight |
|---|---|
| Butadiene | 47.5 |
| Methacrylic acid | 10.0 |
| Potassium persulfate | .18 |
| Triton X–301 | 3 |
| Tertiary octyl mercaptan | .04 |
| Redistilled water | 108 |

The reaction time is 6 to 8 hours for 70% conversion yielding from 22 to 24% methacrylic acid in the copolymer.

*Example 5*

| | Parts by weight |
|---|---|
| Butadiene | 47.5 |
| Methacrylic acid | 10.0 |
| Potassium persulfate | .18 |
| Triton X–301 | 3 |
| Tertiary octyl mercaptan | .06 |
| Redistilled water | 108 |

The reaction time is 6 to 8 hours for 70% conversion yielding from 22 to 24% methacrylic acid in the copolymer.

*Example 6*

| | Parts by weight |
|---|---|
| Butadiene | 47.5 |
| Methacrylic acid | 10.0 |
| Potassium persulfate | .05 |
| Triton X–301 | 3 |
| Tertiary octyl mercaptan | .04 |
| Redistilled water | 108 |

The reaction time is 18 to 22 hours for 70% conversion yielding from 22 to 24% methacrylic acid in the copolymer. It is understood in the foregoing formulas that modifiers are utilized in the polymerization technique to regulate molecular weight and solubility; other mercaptans in addition to the dodecyl and octyl already mentioned, secondary alcohols, and chlorine-containing compounds such as carbon tetrachloride, etc., may be employed. Triton 773, 720 or X–301 (sodium salts-alkyl aryl polyether sulfates and sulfonates) is used as a surface active agent and is employed to obtain desired emulsion copolymerization. Other surface active agents are Tween 40, a poly-ether of partially esterified hexitol and Span 20 which is a sorbitan monolaurate. Other similar agents will operate with equal success.

The copolymers may be made with or without modifiers without varying the results markedly. The use of a modifier gives easier control.

Some test figures using various accelerators within the calculated ranges in connection with Example 4 copolymer are listed here, it being understood that similar results may be obtained using copolymers from any of the other examples, the instant tabulation being illustrative only:

| Peroxide | Percent Active oxygen in cement (Dry Weight Basis) | Pull Test (2 Sq. In. Piece) |
|---|---|---|
| Alperox C (active oxygen 3.76%) | 0.4 | 1,840 |
| Cyclohexanone Peroxide (Technical) (active oxygen 13%) | 1.3 | 2,130 |
| Lupersol DDM (active oxygen 11%) | 1.1 | 1,830 |
|  | 2.7 | 1,980 |
| $H_2O_2$ (30%) (active oxygen 14%) | 3.5 | 2,010 |
| Cumen Hydroperoxide (active oxygen 10.5%) | 0.5 | 1,995 |
|  | 1.0 | 2,305 |
|  | 2.6 | 2,340 |
|  | 4.2 | 2,170 |
| Tertiary Butyl Hydroperoxide (Active oxygen 17.8%) | 0.9 | 1,935 |

Our theory behind the adhesion between the rubber and steel, etc., is based on the premise that the highly polar carboxyl groups in the unsaturated acid portion of the copolymer are attracted strongly to the metal surface. Here they are held not only by strong Van der Waals forces but probably are also held by actual electrovalent bonds resulting from salt formation. The butadiene or major portion of the adhesive, on the other hand, is an unsaturated hydrocarbon closely related to natural rubber, butadiene-styrene copolymers, etc., and as such, it combines directly with the rubber-like stock by vulcanization during the curing process.

We have found that a tempering coat such as is suggested in copending application, Serial No. 645,666, filed February 5, 1946, now abandoned, and assigned to the assignee of the present invention which is merely a highly reinforced rubber-like cement, will, in some cases, improve the adhesive qualities of the present cement. However, in view of the high pulls obtained here, it is not necessary and obviously the one coat process as obtained through the use of the present cement is less costly from a production standpoint and is more easily applied.

While the embodiment of the present invention as herein disclosed, constitutes a preferred form, it is to be understood that other forms might be adopted.

What is claimed is as follows:

1. A laminated structure comprising in combination, a layer of hard non-porous material and a layer taken from the class consisting of natural rubber, polychloroprene and butalastic polymers including a single ethylenic double bond >C=C< which are copolymerizable with butadiene 1,3 in aqueous emulsion and mixtures thereof, and an interposed layer adhering the first two mentioned layers together through a strong coextensive bond which will withstand pulls of more than 750 pounds per square inch comprising as starting ingredients a copolymer of methacrylic acid and butadiene wherein the methacrylic acid comprises 15 to 27% by weight together with a peroxide accelerator wherein the active oxygen available ranges from 0.3 to 5.0% by weight of the copolymer.

2. A laminated structure comprising a metallic layer and a layer of butadiene-styrene copolymer having interposed therebetween a thin layer of adhesion cement comprising as starting ingredients a copolymer of methacrylic acid and butadiene, said methacrylic acid being in quantities of from 15 to 27% by weight together with a peroxide accelerator wherein the active oxygen available ranges from 0.3 to 5.0% by weight of the copolymer.

3. A laminated structure comprising a metallic layer and a layer of polychloroprene having interposed therebetween a thin layer of adhesion cement comprising as starting ingredients a copolymer of methacrylic acid and butadiene, said methacrylic acid being in quantities of from 15 to 27% by weight together with a peroxide accelerator wherein the active oxygen available ranges from 0.3 to 5.0% by weight of the copolymer.

4. A laminated structure comprising a metallic layer and a layer of natural rubber having interposed therebetween a thin layer of adhesion cement comprising a copolymer of methacrylic acid and butadiene, said methacrylic acid being in quantities of from 15 to 27% by weight together with a peroxide accelerator wherein the active oxygen available ranges from 0.3 to 5.0% by weight of the copolymer.

5. A laminated structure comprising a metallic layer and a layer of butadiene-acrylonitrile copolymer having interposed therebetween a thin layer of adhesion cement comprising as starting ingredients a copolymer of methacrylic acid and butadiene, said methacrylic acid being in quantities of from 15 to 27% by weight together with a peroxide accelerator wherein the active oxygen available ranges from 0.3 to 5.0% by weight of the copolymer.

6. A laminated structure comprising in combination, a layer of hard non-porous material and a layer taken from the class consisting of natural rubber, polychloroprene and butalastic polymers including a single ethylenic double bond >C=C< which are copolymerizable with butadiene 1,3 in aqueous emulsion and mixtures thereof, and an interposed layer consisting of starting ingredients comprising a copolymer of a diene compound and an unsaturated acid taken from the class consisting of methacrylic acid and acrylic acid wherein the unsaturated acid is present in quantities of from 15 to 27% by weight together with a peroxide taken from the class consisting of: hydrogen peroxide, phenyl-dimethyl-hydroperoxy methane, tertiary butyl hydroperoxide, cyclohexanone peroxide and methyl-ethyl-ketone-peroxide in quantities sufficient to yield to from 0.3 to 5.0% active oxygen by weight of the copolymer.

7. An adhesion cement consisting of a copolymer of a diene compound taken from the class consisting of butadiene and isoprene and an unsaturated organic acid taken from the class consisting of methacrylic acid and acrylic acid, said unsaturated organic acid being present in quantities of from 15 to 27% by weight, a solvent taken from the class consisting of cyclohexanone and dioxane and a peroxide accelerator taken from the class consisting of: hydrogen peroxide, phenyl-dimethyl-hydroperoxy methane, tertiary butyl hydroperoxide, cyclohexanone peroxide and methyl-ethyl-ketone-peroxide in quantities sufficient to yield to from 0.3 to 5.0% active oxygen by weight of the copolymer on a dry weight basis.

8. An adhesion cement consisting of a fluid mixture of butadiene and methacrylic acid in copolymerized form wherein the methacrylic acid is in quantities of from 15 to 27% by weight, a fluid vehicle for dissolving the copolymer in a solvent consisting essentially of cyclohexanone which includes a peroxide accelerator taken from the class consisting of: hydrogen peroxide, phenyl-dimethyl-hydroperoxy methane, tertiary butyl hydroperoxide, cyclohexanone peroxide and methyl-ethyl-ketone-peroxide in quantities sufficient to yield to from 0.3 to 5.0% active oxygen by weight of the copolymer on a dry weight basis.

9. A laminated structure comprising in combination, a layer of hard non-porous material and a layer taken from the class consisting of natural rubber, polychloroprene and butalastic polymers including a single ethylenic double bond >C=C< which are copolymerizable with butadiene 1,3 in aqueous emulsion and mixtures thereof, and an interposed layer adhering the first two mentioned layers together through a strong coextensive bond which will withstand pulls of more than 750 pounds per square inch comprising as starting ingredients a copolymer of methacrylic acid and butadiene wherein the methacrylic acid comprises 17 to 24% by weight and an accelerator consisting of phenyl-dimethyl-hydroperoxy methane in quantities of from 0.5 to 3.0% by weight of the copolymer.

10. A laminated structure comprising in combination, a layer of hard non-porous material and a layer taken from the class consisting of natural rubber, polychloroprene and butalastic polymers including a single ethylenic double bond >C=C< which are copolymerizable with butadiene 1,3 in aqueous emulsion and mixtures thereof, and an interposed layer adhering the first two mentioned layers together through a strong coextensive bond which will withstand pulls of more than 750 pounds per square inch comprising a copolymer of methacrylic acid and butadiene wherein the methacrylic acid ranges from 15 to 27% by weight and a small quantity of an accelerator taken from the class consisting of: hydrogen peroxide, phenyl-dimethyl-hydroperoxy methane, tertiary butyl hydroperoxide, cyclohexanone peroxide and methyl-butyl-ketone-peroxide in quantities of from 0.3 to 5.0% by weight of the copolymer.

11. An adhesion cement consisting of a copolymer of a diene compound taken from the class consisting of a butadiene and isoprene and an unsaturated organic acid taken from the class consisting of methacrylic acid and acrylic acid, said unsaturated organic acid being present in quantities of from 17 to 24% by weight, a solvent taken from the class consisting of cyclohexanone and dioxane and an accelerator consisting of phenyl-dimethyl-hydroperoxy methane in quantities of from 0.3 to 5.0% by weight of the dry copolymer.

12. An adhesion cement consisting of a fluid mixture of butadiene and methacrylic acid in copolymerized form wherein the methacrylic acid is in quantities of from 15 to 27% by weight, 0.5 to 3.0% by weight of the dry copolymer of an accelerator consisting of phenyl-dimethyl-hydroperoxy methane and a solvent for the copolymer consisting essentially of cyclohexanone.

13. An adhesion cement consisting of a fluid mixture of butadiene and methacrylic acid in copolymerized form wherein the methacrylic acid is in quantities of from 17 to 24% by weight, 0.3 to 5.0% by weight of the dry copolymer of an accelerator consisting of phenyl-dimethyl-hydroperoxy methane and a solvent for the copolymer consisting essentially of cyclohexanone.

References Cited in the file of this patent

UNITED STATES PATENTS

| Number | Name | Date |
| --- | --- | --- |
| 2,058,246 | McCortney | Oct. 20, 1936 |
| 2,394,375 | Gross | Feb. 5, 1946 |
| 2,395,505 | Sarbach | Feb. 26, 1946 |
| 2,456,454 | Signer | Dec. 14, 1948 |
| 2,510,090 | Di Masi | June 6, 1950 |
| 2,604,466 | Fryling et al. | July 22, 1952 |